United States Patent [19]

Cockle et al.

[11] 4,428,707
[45] Jan. 31, 1984

[54] ROUND BALE FEEDER

[76] Inventors: Richard A. Cockle, c/o George Spector, 3615 Woolworth Bldg., 233 Broadway; George Spector, c/o Richard A. Cockle, 3615 Woolworth Bldg., 233 Broadway, both of New York, N.Y. 10007

[21] Appl. No.: 323,661

[22] Filed: Nov. 20, 1981

[51] Int. Cl.³ .................. B65H 51/08; B65H 49/24
[52] U.S. Cl. .................................. 414/24.6; 198/669; 222/618; 239/681
[58] Field of Search .............. 414/24.5, 24.6; 239/650, 681, 675; 222/613, 618, 623; 198/669, 840, 786

[56] References Cited

U.S. PATENT DOCUMENTS

| | | | |
|---|---|---|---|
| 1,194,226 | 8/1916 | Pickett | 239/681 |
| 1,445,265 | 2/1923 | Bohmker | 239/681 |
| 3,874,609 | 4/1975 | Larson | 414/24.5 |
| 4,025,006 | 5/1977 | Turnbow | 414/24.6 X |
| 4,044,967 | 8/1977 | Guichon | 414/24.6 |
| 4,078,733 | 3/1978 | Popiolek | 414/24.6 X |
| 4,088,272 | 5/1978 | Grillot | 414/24.5 X |
| 4,195,958 | 4/1980 | Vahlkamp et al. | 414/24.6 |

FOREIGN PATENT DOCUMENTS 1242026 8/1960 France ........................... 239/681

*Primary Examiner*—Robert J. Spar
*Assistant Examiner*—Janice Krizek

[57] ABSTRACT

A device for unrolling a round bale of hay when being discharged upon the ground from a hay carrying vehicle, said device including a mechanism in which a plurality of rollers form a cradle upon which the hay bale is rested, the rollers being power rotated so as to unroll the hay bale as it sits in the cradle so that a mat of hay is spread on the ground.

2 Claims, 5 Drawing Figures

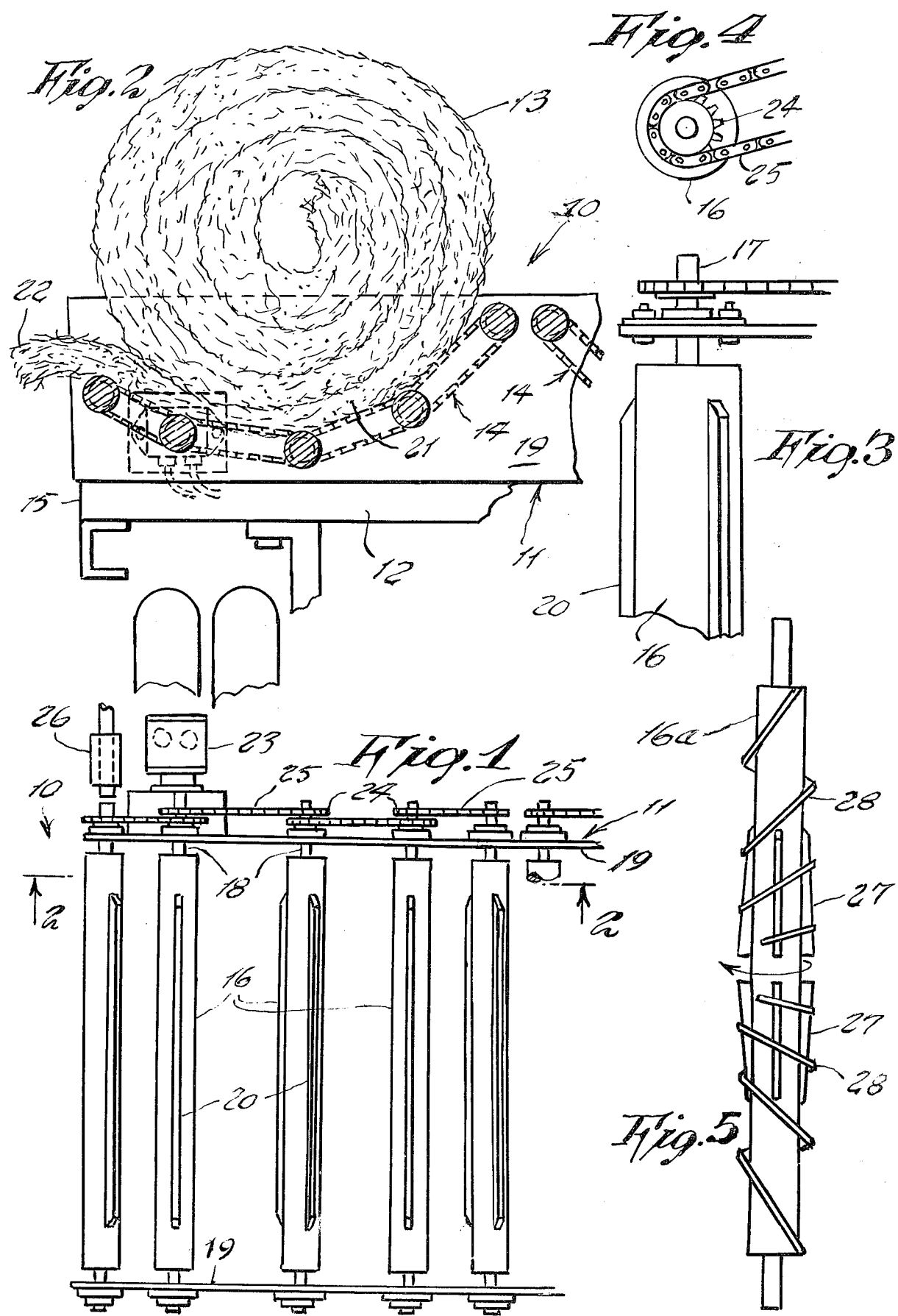

ROUND BALE FEEDER

This invention relates generally to farming and ranch equipment, where a large number of stock are raised. More specifically it relates to an attachment mountable upon a hay-carrying wagon or vehicle.

It is well known that hay must be spread out upon the ground during a winter so that stock can feed therefrom during such seasons when the stock cannot graze on fresh growing grasses in a field, meadow or prairie. In the far past, hay for feeding such stock in winter was removed by pitch forks from the wagon and thrown down upon the ground. More recently such hay was baled for convenience in handling, and such bales were dropped onto the ground, from a vehicle, where the bale was then broken open and spread out.

Still more recently such bales are often made into a cylindrical shape by means of rolling up the hay. These commercially made bales may be five or six feet in length and may weigh up to a ton, so to require mechanical devices in being handled in rolling off the vehicle.

A principle object of the present invention is to provide a device which unrolls the cylindrical shaped bale of hay as it is being discharged from the vehicle, so as to eliminate the extra work of unrolling the bale after it has been dropped off the vehicle, and which thus is ready for stock to forage thereupon.

FIG. 1 is a top view of the invention.

FIG. 2 is a side cross sectional view on line 2—2 of FIG. 1.

FIG. 3 is an enlarged top view detail of the roller and its device.

FIG. 4 is an end view thereof.

FIG. 5 is a side view of a roller with a modified design of cleats which aid in spreading the hay bale in width as it is discharged from the feeder, so to be more loose for the stock to feed thereupon.

Referring now to the drawing in greater detail, and more particularly to FIGS. 1 through 4 thereof, at this time, the reference numeral 10 represents a round bale feeder according to the present invention, wherein there is a frame 11 mountable upon the bed of a wagon or vehicle 12 which transports a plurality of round hay bales 13 into the stock feeding yard. The frame supports two mechanisms 14, each of which serves to discharge the hay bale in an unrolled condition over a side 15 of the vehicle.

Each mechanism 14 includes a plurality of rollers 16 affixed on shafts 17 journalled in bearings 18 of opposite side walls 19 of the frame. Each roller includes cleats 20 for frictionally engaging the hay bale. As shown in FIG. 1, the rollers are parallel to each other, in spaced apart relation, but the central rollers are located lower than the endmost rollers in order to form a depression 21 thereabove in which the rolled bale sits and from where the end 22 of the bale is paid out over the endmost rollers, as the bale is rotated in order to unwind as a flat mat upon the ground.

In operative use, the hay bale upon the mechanism is rotated by power from a motor 23 mounted on an outer side of the frame, and which by means of gears 24 on all the shafts 17 and endless chains 25 between the gears, rotates all the shafts at a same time. A sliding coupling 26 connectable to one of the shafts, allows the motor to additionally power other units.

FIG. 5 illustrates another design of roller 16a which includes a plurality of cleats 27 therearound which taper in height toward outward ends of the shaft. Additionally, a spiral cleat 28 around each end of the roller extends across a top of the cleats 27, the turns of the cleats 28 being progressively more spread apart toward the outward ends of the shaft, and which serves to spread the hay mat transversely as it is being discharged from the vehicle.

While various changes may be made in the detailed construction, it is understood that such changes will be within the spirit and scope of the present invention as is defined by the appended claims.

What is claimed:

1. A round bale feeder for unrolling hay bales when being discharged from a hay transporting vehicle, comprising in combination a frame, a mechanism in each end of said frame including a plurality of rollers affixed on rotatably driven shafts, parallel to each other and spaced apart at rising elevations from center to the endmost of the rollers to form a depression upon which said hay bales are rested while being unrolled, each of said rollers having means to spread said bales laterally while being unrolled wherein a gear on each said shaft is engaged by an endless belt driven by power from a motor in combination with other endless belts interconnecting at the gears of adjacent rollers, said means on the rollers to spread said bales laterally comprise a plurality of cleats which taper from a greater center height to a smaller height at each of the roller's ends, said cleats extending along the periphery of the roller surface and being parallel to the axis of the roller.

2. A feeder as in claim 1 wherein a spiral cleat with speading spacing is provided about the rollers and cleats.

* * * * *